L. P. NORMANDIN.
CEMENT BLOCK MOLDING MACHINE.
APPLICATION FILED DEC. 1, 1908.

944,272.

Patented Dec. 28, 1909.
5 SHEETS—SHEET 1.

L. P. NORMANDIN.
CEMENT BLOCK MOLDING MACHINE.
APPLICATION FILED DEC. 1, 1906.

944,272.

Patented Dec. 28, 1909.

5 SHEETS—SHEET 2.

Witnesses
James P. Barry
Thos. O'Donnell

Inventor
Levi P. Normandin
By Whitmore Hulbert & Whitmore
attys

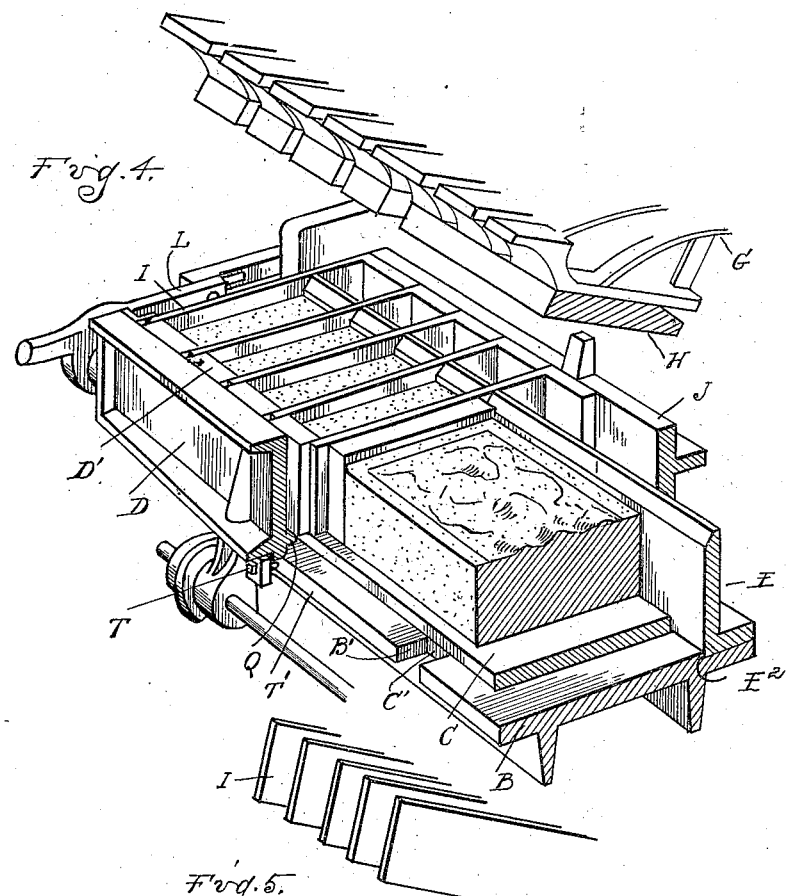
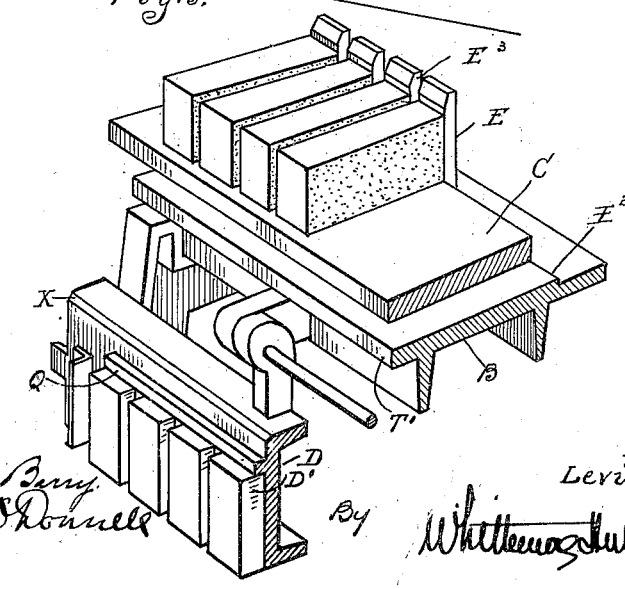

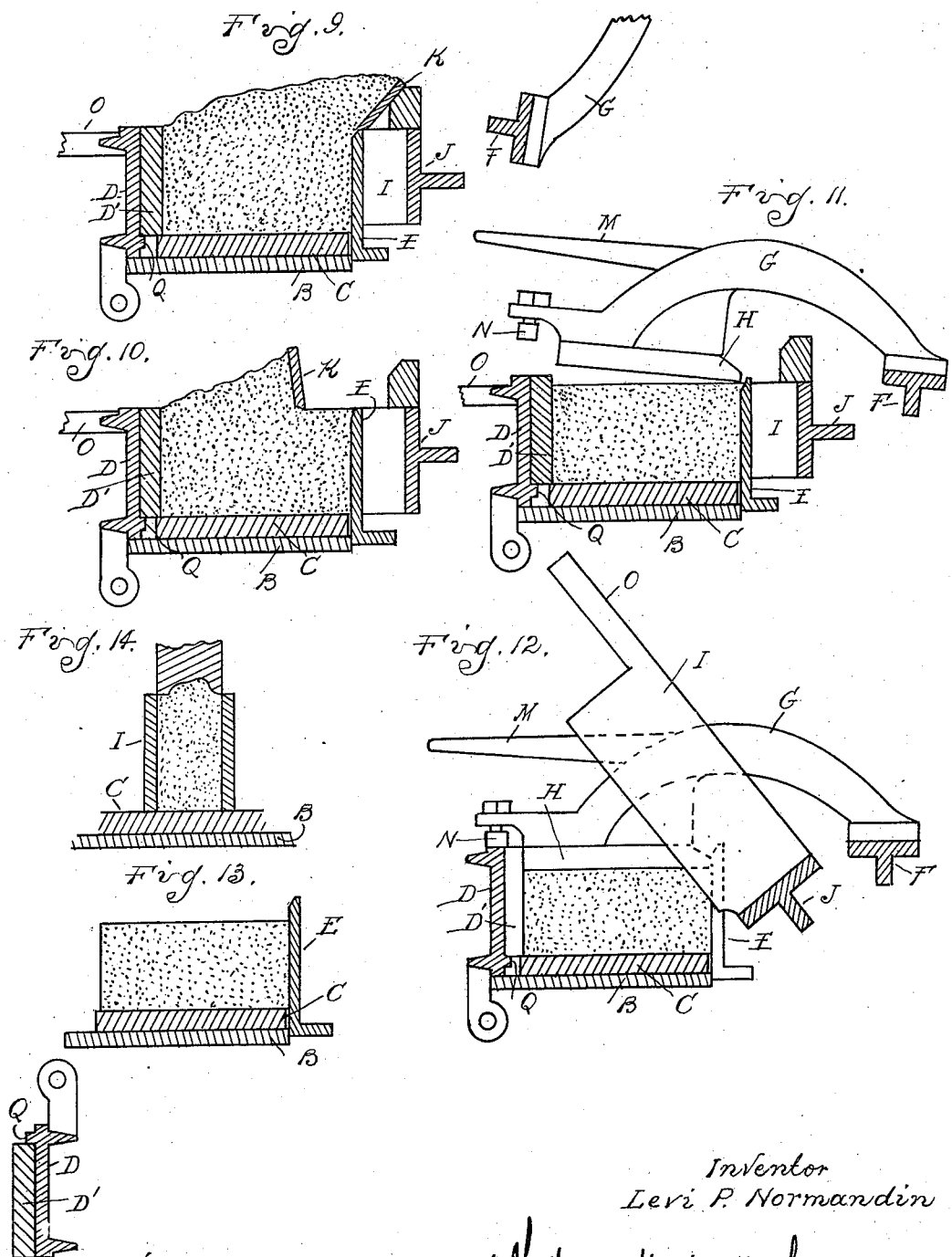

L. P. NORMANDIN.
CEMENT BLOCK MOLDING MACHINE.
APPLICATION FILED DEC. 1, 1906.
944,272.
Patented Dec. 28, 1909.
5 SHEETS—SHEET 5.
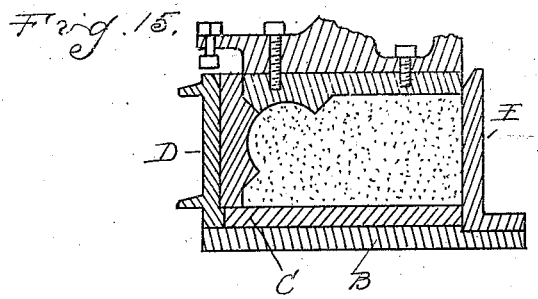
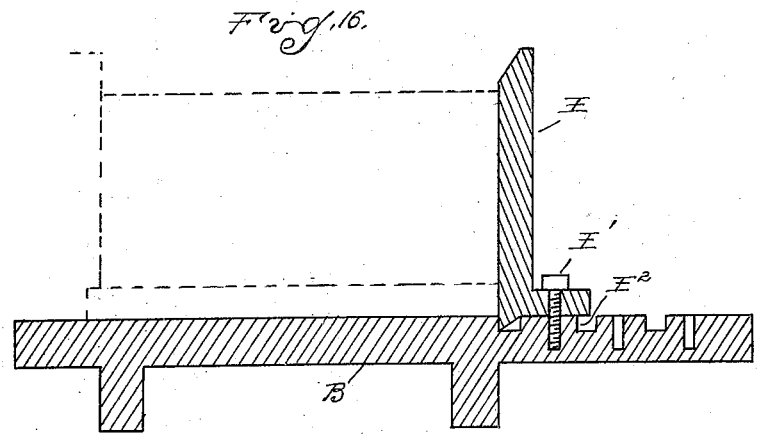

UNITED STATES PATENT OFFICE.

LEVI P. NORMANDIN, OF JACKSON, MICHIGAN, ASSIGNOR TO WILLIAM F. COWHAM, OF JACKSON, MICHIGAN.

CEMENT-BLOCK-MOLDING MACHINE.

944,272.

Specification of Letters Patent. Patented

Application filed December 1, 1906. Serial No. 345,860.

*To all whom it may concern:*

Be it known that I, LEVI P. NORMANDIN, a citizen of the United States of America, residing at Jackson, in the county of Jackson and State of Michigan, have invented certain new and useful Improvements in Cement-Block-Molding Machines, of which the following is a specification, reference being had therein to the accompanying drawings.

It is the object of the invention to obtain a construction of molding machine which is adapted for a large variety of work, such, for instance, as the formation of imitation stone, building blocks, sills and caps, and building brick.

It is a further object to render the machine easily adjustable for various sizes, and particularly to adapt it for the formation of various sizes and shapes of brick.

Still, further, it is an object to perform the work with great accuracy and uniformity.

With these and other objects in view, the invention consists in the construction as hereinafter set forth.

Figure 1:
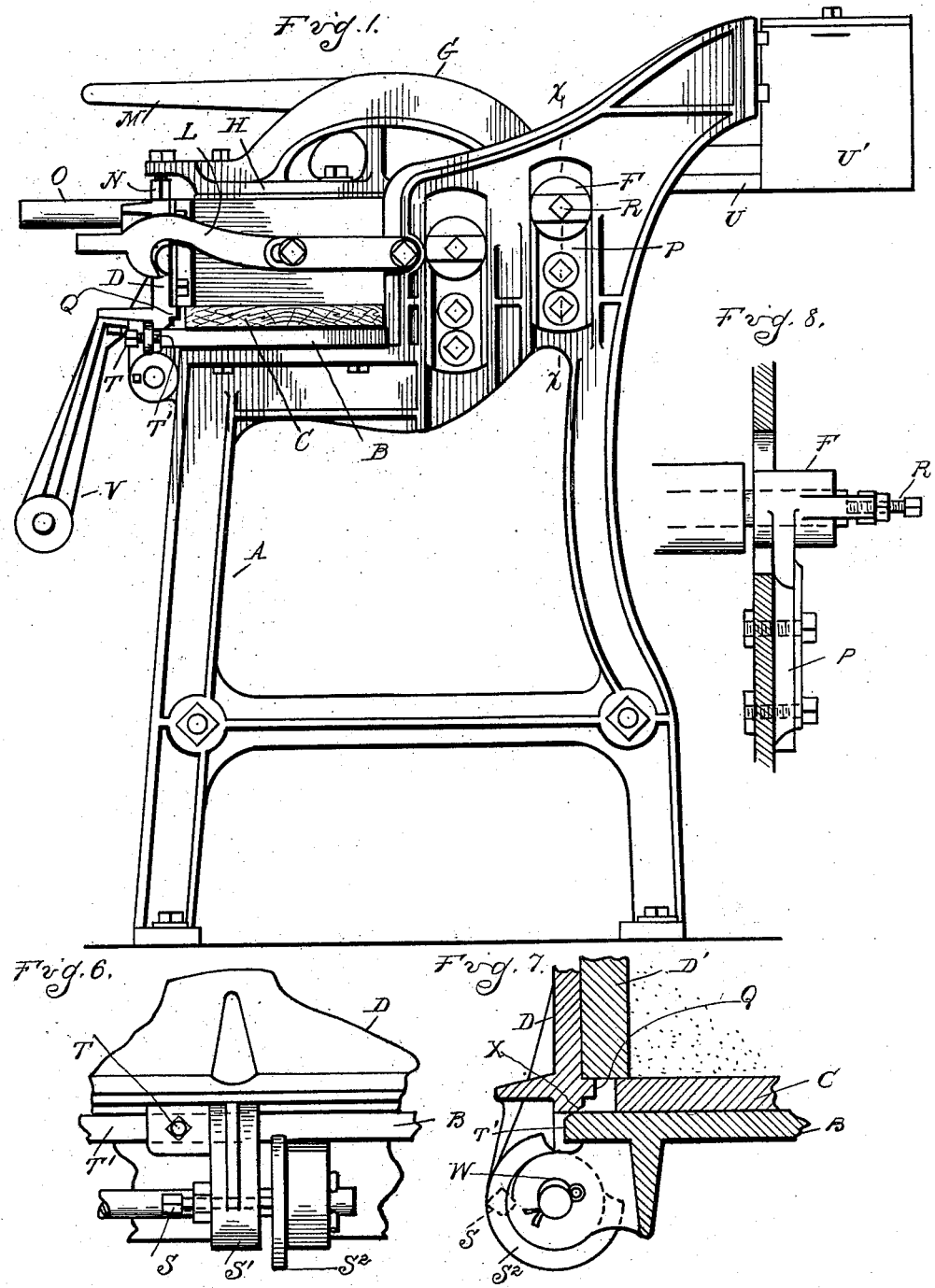
Figure 2:
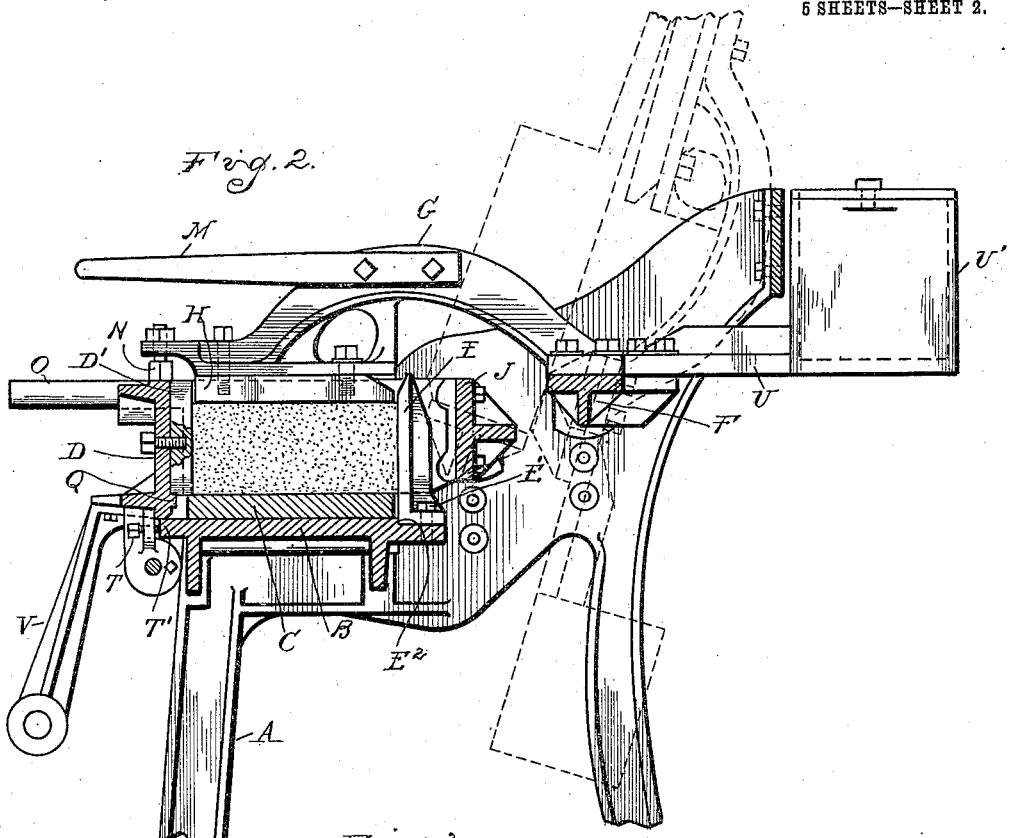
Figure 3:
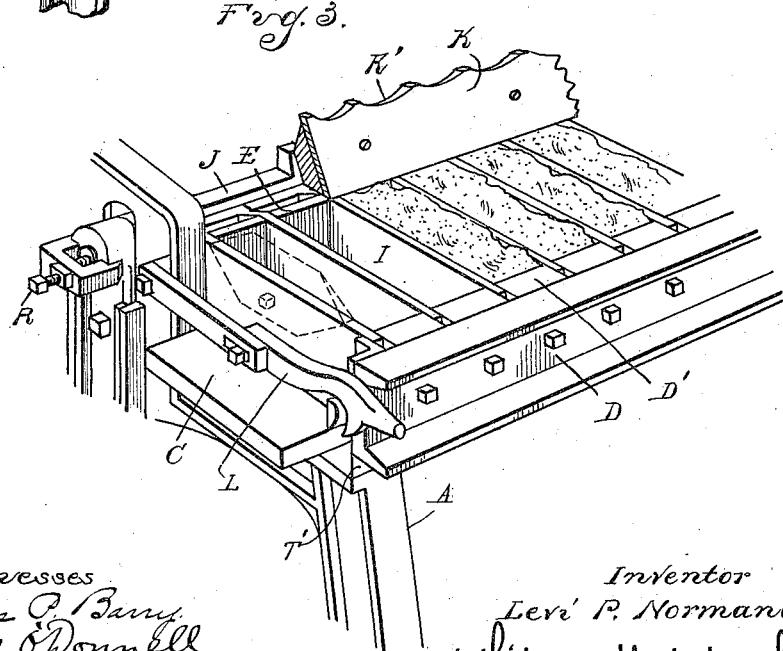

In the drawings, Figure 1 is an end elevation of the machine; Fig. 2 is a vertical cross section thereof; Fig. 3 is a perspective view of a portion of the machine illustrating one step in its operation; Figs. 4 and 5 are similar views with the parts in different positions; Fig. 6 is a front elevation of the hinge connection for the front molding plate; Fig. 7 is an end elevation thereof; Fig. 8 is a section on line $x-x$, Fig. 1; Figs. 9, 10, 11, 12 and 13 are diagrammatic cross sections; Fig. 14 is a longitudinal section through one of the compartments of the mold, illustrating the formation of a brick with a rough or rock face; Fig. 15 is a section similar to Fig. 2 illustrating pattern faces attached to the tamper and front plate; and Fig. 16 is a similar section illustrating an adjustable rear plate for altering the length of the brick.

A are suitable standards upon the forward portion of which is mounted a bed or table B. This bed supports the pallets or bottom board C, upon which the blocks or brick are molded and removed for drying. The pallets are preferably formed of wood and, to prevent warping, are provided on their under sides with cross cleats C', which fit in transverse grooves B' in the bed, thereby permitting the greater portion of the surface of the pallets to rest directly upon the top of the bed.

D is a plate forming the front side of the mold, which is hinged to the front of the bed, and is capable of being turned to extend upwardly or downwardly.

E is a rear plate detachably secured to the bed, as by the bolts E', and set in parallelism from the front plate by fitting against a longitudinally extending shoulder $E^2$ planed or otherwise formed in the bed.

Pivotally supported in the frame, in rear of the bed B, is a longitudinally extending rock bar or shaft F. This rock bar is provided with forwardly projecting arms G, extending over the bed, and H is a plate secured to the arms G and fitting between the front and rear plates D and E. The rock bar F, arms G and plate H together constitute a means for tamping the plastic material, which is filled in the mold between the front and rear plates D and E, the plate H also constituting a top molding face. Thus, by raising and lowering the arms G, the tamping of the material is effected and the upper face of the molded body is fashioned as desired.

Where the machine is to be used for the molding of brick, the rear plate E is sectional, each section being the width of a brick, and being separated from the adjacent sections by vertical slots $E^3$.

I are division plates for separating the brick, which plates are adjustably secured at their rear ends to a rock bar J, also journaled in bearings in the frame. The plates I fit in the slots $E^3$ between the sections of the rear plate and extend across the pallet C to the front plate D. This front plate is provided with a series of mold faces D', adjustably secured thereto, and corresponding in width to the sections of the rear plate E. Division plates I extend into the slots between these faces D', and are thus held rigidly in position in relation to both front and rear plates.

K is a bar normally extending longitudinally of the bed, and supported in an inclined position with its lower edge adjacent to the top of the rear plate E. This bar forms a deflector or hopper side for deflecting the plastic material into the mold cavities, and preventing it from spilling over in rear of the mold. The bar K is unattached to the other parts of the machine, and is designed to be also used for striking off the surplus plastic material from the top of the mold. This operation is performed by drawing the bar forward from its normal position, thereby scraping off the surplus material. The upper edge of the bar is preferably scalloped, as indicated at K', the purpose being to reverse the bar where it is desired to form rock face brick, the scallops leaving mounds of the material above each mold cavity.

With the parts constructed as thus far described in operation the mold is first adjusted for use by rocking the shaft J, so that the division plates I extend over the pallet C turning the front plate D upward in parallelism with the rear plate and locking it in this position by suitable means, such as the end hooked bars L. The inclined bar K is then placed in position after which the plastic material is filled into the mold, and when the cavities are full they are struck off by drawing the bar K forward. The operator then turns the rock bar J, preferably by means of handles M attached to the arms G swinging said arms and the said plate H downward until the latter strike against the plastic material. The plate H corresponds in width and position to the sectional rear plate E and the front molding face D' and thus they will fit between the division plates I. This permits of the operator tamping the material by successively raising and lowering the handles M until the desired degree of compression is attained. The final position of the plate H is determined by arranging stops for limiting the downward movement. These stops are preferably attached to the individual arms G and preferably to the forward ends thereof so that they contact with the upper edge of the front plate D, as indicated at N. These stops are preferably adjustable, as by providing them with screw threaded shanks engaging the arms G.

After the tamping is accomplished, and while the plates H are still in contact with the upper face of the molded brick the division plates I are withdrawn. This operation is performed by rocking the bar J, to which all of said plates are attached, and for this purpose a forwardly projecting handle O is provided. The operator, by lifting upon this handle O, will raise simultaneously all of the plates I through the slots between the plates H, the said plates acting as strippers for preventing the tearing of the edges of the brick during the withdrawal of the division plates. The operator next raises the plates H by means of the handles M, and then unlocks the hooked arms L and drops downward the hinged front plate D. This will permit of removing the brick by lifting the pallets C after which a new pallet is placed on the bed, and the operation is repeated.

As has been stated, the machine is adapted for the making of either brick or blocks of greater dimensions. For the latter work, the small sections of the rear plate E and front molding face D' are replaced by longer sections and the division plates I, opposite these longer sections, are detached from the rock bar J. Bricks of various dimensions may also be molded by adjusting the machine, and to this end the division plates I and arms G are individually adjustably secured to their respective rock bars J and F. The front molding faces D' are also individually removable and adjustable. To change the height of the brick, the rock shaft F is vertically adjustable as by securing it in vertically adjustable bearings P secured to the standards A. By raising or lowering these bearings, and by correspondingly adjusting the stops N, the plates H may be raised or lowered and maintained parallel to the pallet C.

It is very essential in the molding of brick that the faces thereof should be perfectly rectangular, and it is equally essential that the brick should be uniform in size and shape. This requires accurate adjustment of the machine. On the other hand, it is desirable that the adjustment should be made as quickly as possible, and without requiring a high degree of skill on the part of the workmen. Moreover, the fact that sand is strewn over the machine makes it difficult to provide close fitting joints without danger of binding. I have avoided these difficulties by a construction in which the setting of the various parts is guided by machined shoulders on the adjacent parts. Thus, the front plate D is provided with a longitudinally extending rib or bead Q against the planed face of which the lower edges of the individual face blocks D' may be placed. The bed B has planed therein the shoulder $E^2$ heretofore mentioned, against which the sectional plates E bear, and the rock bars F and J together with the hinged front plate D are individually longitudinally adjustable so that the attached parts thereto may be set in exact registration. The longitudinal adjustment of the rock bars F and J is preferably formed by set screws R bearing against the opposite ends of said bars. The setting of the front plate D longitudinally is effected by set screws S on the hinged lugs S' bearing against adjacent lugs or flanges $S^2$ on the bed. The plate D is also adjusted to be rectangular in its relation to the bed by a set screw T, which bears against the edge T' of the bed. The machine is also provided with suitable counterweights, such as the rearwardly extending arms U for the rock bar F carrying the weight boxes U', and the hinged front plate D is provided with the downwardly extending counterweight arm V.

Inasmuch as wooden pallets are preferably used, these may vary slightly in thickness due to the swelling or shrinkage of the wood, or from other causes. I therefore preferably provide means by which in closing the front plate D, the front molding face D' thereof will always be brought into contact with the upper face of the pallet. This, as illustrated in Fig. 7, is accomplished by providing a clearance, indicated at W, for the hinge pivot, so that the plate D may be slightly raised or lowered. An inclined bearing X is also formed on the plate D, and so arranged that it will mount upon the front edge of the bed, lifting the hinged plate D as it is swung upward, and permitting it to drop with the lower edges of the faces D' resting upon the pallet.

In order to change the length of the brick or the width of the blocks molded, an adjustable rear plate E may be employed, which is bolted or otherwise secured to the bed, and adjustable to different positions thereon. The plate is accurately set in its different positions by means of the shoulders E², which may be formed by one edge of a series of grooves planed in the bed.

For forming ornamental brick, pattern faces may be substituted for the plain plates H and the molding faces D', as illustrated in Fig. 15. Thus, by changing these face plates, any desired form of brick may be obtained.

What I claim as my invention is:

1. In a machine for molding blocks, the combination with a mold, of a series of division plates engaging slots in said mold and extending across the same, a rockable member to which said division plates are secured, a series of top plates fitting between division plates, a rockable bar to which said top plates are secured constituting in connection with said plates a tamper for the plastic material, for the purpose described.

2. A machine for molding blocks comprising a bed, a pallet detachably supported thereon, a hinged plate forming the front of a mold box extending above said pallet, a parallel rear plate provided with a series of slots therein, a member rockable in relation to said bed and pivoted in rear of said pallet, a series of division plates secured to said rockable member, and registering with the slots in said rear plate whereby the entire series may be rocked out of or into engagement with the mold.

3. In a machine for molding blocks, the combination with a mold box having division plates therein for supporting the same, of a plurality of separate compartments, a detachable bar supported in an inclined position above said mold box alined with one edge thereof, said bar being reversible and notched on one edge, for the purpose described.

4. In a block molding machine, the combination with a mold box having transverse slots in parallel sides thereof for the reception of division plates, and means for relatively adjusting said parallel sides longitudinally to aline said slots.

5. In a block molding machine, a mold comprising a stationary side and a parallel hinged side, both of said sides being transversely slotted, and means for adjusting said hinged side axially to aline the slots thereof with those of the stationary side.

6. In a block molding machine, the combination of a bed, of a mold side hinged thereto, so as to be capable of axial adjustment, a guide flange parallel to the plane of movement of said hinged side, and a coöperating adjustable screw bearing thereagainst, the one being fixed to said hinged side and the other to said bed, for the purpose described.

7. In a block molding machine, the combination with a bed, of a pallet resting thereon, a side plate hinged to said bed and swinging over to rest upon said pallet, and means for permitting a vertical movement of said plate upon its hinged pivot to compensate for variations in the thickness of said pallet.

8. In a machine for molding blocks, the combination with a bed, a pallet supported thereon, a mold side plate hinged to said bed and swinging over the same to rest on said pallet, means for permitting a vertical movement of said plate on its hinged pivot and a lifting bearing on said bed with which said plate contacts in advance of its contact with said pallet, for the purpose described.

9. In a block molding machine, the combination of a series of adjustable mold face sections, a common member to which said sections are attached, and a straight edge rib or shoulder upon said member for alining said adjustable sections.

10. In a block molding machine, the combination with a bed, of a mold side hinged thereto and an adjustable stop for limiting the movement of said mold side in relation to said bed, for the purpose described.

11. In a block molding machine, the combination with a mold, of two independently rockable members pivoted in rear of said mold, a series of division plates projecting forward into said mold from one of said rockable members, a series of top molding plates secured to the other rockable member and fitting between said division plates and means at the front of the mold for independently actuating said rockable members, for the purpose described.

12. In a block molding machine, the combination with a bed, of a mold divided into a series of compartments, a series of top plates for said compartments, a series of arms carrying said plates, a bar member extending longitudinally of said mold having a pivotal connection with said bed, the rear ends of said arms being connected to said bar member, whereby the rocking of said bar rocks all of said arms.

13. In a machine for molding blocks, the combination with a mold, of a series of division plates engaging slots in said mold and extending across the same, a rockable member to which said division plates are secured, a second rockable member, arms projecting from said last-mentioned rockable member corresponding to the several compartments in the mold, a plate upon each arm fitting its respective compartment, and individual stops upon the outer ends of said arms for limiting the inward movement of said plates.

In testimony whereof I affix my signature in presence of two witnesses.

LEVI P. NORMANDIN.

Witnesses:
AMELIA WILLIAMS,
JAMES P. BARRY.